US012676259B2

(12) United States Patent
Emoto

(10) Patent No.: US 12,676,259 B2
(45) Date of Patent: Jul. 7, 2026

(54) SIGNAL TRANSMISSION CIRCUIT

(71) Applicant: MITSUBISHI HEAVY INDUSTRIES, LTD., Tokyo (JP)

(72) Inventor: Hideaki Emoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1021 days.

(21) Appl. No.: 17/782,295

(22) PCT Filed: Nov. 18, 2020

(86) PCT No.: PCT/JP2020/042887
§ 371 (c)(1),
(2) Date: Jun. 3, 2022

(87) PCT Pub. No.: WO2021/117432
PCT Pub. Date: Jun. 17, 2021

(65) Prior Publication Data

US 2023/0041632 A1 Feb. 9, 2023

(30) Foreign Application Priority Data

Dec. 9, 2019 (JP) ................................ 2019-222163

(51) Int. Cl.
*H01F 27/28* (2006.01)
*H01F 27/24* (2006.01)
*H01F 27/32* (2006.01)

(52) U.S. Cl.
CPC ......... *H01F 27/2804* (2013.01); *H01F 27/24* (2013.01); *H01F 27/323* (2013.01); *H01F 2027/2809* (2013.01)

(58) Field of Classification Search
CPC ......... H01F 27/2804; H01F 2027/2809; H01F 17/0006; H01F 17/0013; H01F 5/003; H01F 38/14; H02J 50/10; H02J 50/12
(Continued)

(56) References Cited

U.S. PATENT DOCUMENTS 7,741,943 B2 6/2010 Fouquet et al.
8,421,505 B2 * 4/2013 Nakanishi ............ H02M 7/538 327/108
(Continued)

FOREIGN PATENT DOCUMENTS

DE 102004041925 A1 4/2005
DE 102005036806 A1 2/2007
(Continued)

OTHER PUBLICATIONS

Office Action dated May 22, 2024, issued in counterpart JP application No. 2019-222163, with English translation. (19 pages).
(Continued)

*Primary Examiner* — Tszfung J Chan
(74) *Attorney, Agent, or Firm* — WHDA, LLP

(57) ABSTRACT

A signal transmission circuit for transmitting an insulation signal includes: a multilayer substrate including a plurality of layers; and a pattern transformer disposed on the multilayer substrate. The pattern transformer includes a primary winding having a wound printed pattern wiring provided in each of a first plane region and a second plane region of the multilayer substrate, and a secondary winding disposed at a different position from the primary winding in a layer direction and having a wound printed pattern wiring provided in each of the first plane region and the second plane region of the multilayer substrate. The primary winding and the secondary winding are electromagnetically coupled and configured such that a current flows clockwise through one of the wound printed pattern wiring provided in the first plane region or the wound printed pattern wiring provided in the second plane region while a current flows counterclockwise through the other.

3 Claims, 5 Drawing Sheets

(58) Field of Classification Search
USPC .................................................. 336/200, 232
See application file for complete search history.

(56) References Cited

U.S. PATENT DOCUMENTS

| | | | | |
|---|---|---|---|---|
| 2004/0232971 | A1* | 11/2004 | Kawasaki | H03K 17/063 327/427 |
| 2005/0057181 | A1 | 3/2005 | Izumi et al. | |
| 2007/0216377 | A1* | 9/2007 | Yoshimura | H04L 25/0266 323/250 |
| 2008/0190906 | A1 | 8/2008 | Aigner | |
| 2010/0072971 | A1* | 3/2010 | Nuebling | H02M 1/08 323/299 |
| 2014/0091854 | A1 | 4/2014 | Murata | |
| 2018/0175735 | A1 | 6/2018 | Zhao et al. | |
| 2018/0343742 | A1 | 11/2018 | Ando et al. | |
| 2020/0350117 | A1* | 11/2020 | Nabih | H01F 27/40 |
| 2021/0143675 | A1 | 5/2021 | Nakao et al. | |
| 2022/0270816 | A1* | 8/2022 | Takeda | H01F 30/10 |

FOREIGN PATENT DOCUMENTS

| | | | | | |
|---|---|---|---|---|---|
| JP | 04-185396 | A | | 7/1992 | |
| JP | H04185396 | A | * | 7/1992 | |
| JP | 09-283335 | A | | 10/1997 | |
| JP | H09283335 | A | * | 10/1997 | |
| JP | 2004-274262 | | | 9/2004 | |
| JP | 2004-274262 | A | | 9/2004 | |
| JP | 2007-250891 | A | | 9/2007 | |
| JP | 2011181889 | A | * | 9/2011 | |
| JP | 2018102119 | A | * | 6/2018 | H02M 3/3376 |
| JP | 2018-198246 | A | | 12/2018 | |
| JP | 2019-146359 | A | | 8/2019 | |
| WO | 2012/169401 | A1 | | 12/2012 | |
| WO | WO-2018211912 | A1 | * | 11/2018 | H02J 50/80 |

OTHER PUBLICATIONS

International Preliminary Report on patentability (Form PCT/IB/338) issued in counterpart International Application No. PCT/JP2020/042887 dated Jun. 23, 2022, with Form PCT/IB/373, PCT/ISA/237, PCT/IB/326 with English machine translation. (16 pages).

International Search Report dated Dec. 28, 2020, issued in counterpart application No. PCT/JP2020/042887. (11 pages).

Office Action dated Feb. 19, 2026, issued in counterpart DE Application No. 11 2020 005 247.8, with English translation.(15 pages).

* cited by examiner

SIGNAL TRANSMISSION CIRCUIT

TECHNICAL FIELD

The present disclosure relates to a signal transmission circuit for transmitting an isolation signal.

BACKGROUND

As a signal transmission circuit for transmitting an isolation signal, a configuration including a semiconductor switching element and a transformer has been proposed. For example, Patent Documents 1 and 2 disclose a transformer having a layered structure in which multiple layers with a printed wiring pattern are superposed.

Citation List

Patent Literature

Patent Document 1: JP2018-198246A
Patent Document 2: JP2019-146359A

SUMMARY

Problems to be Solved

The transformer disclosed in Patent Documents 1 and 2 is provided with a core which is a magnetic material. The configuration with the core is enlarged as a whole. However, if the core is omitted in the transformer, the leakage flux from the winding increases in a plane region outside the winding, which causes an unfavorable problem due to the leakage flux. It is thus difficult to downsize the transformer by omitting the core.

In view of the above, an object of the present disclosure is to provide a signal transmission circuit with a compact design.

Solution to the Problems

A signal transmission circuit according to the present disclosure is a signal transmission circuit for transmitting an insulation signal, comprising: a multilayer substrate including a plurality of layers; and a pattern transformer disposed on the multilayer substrate. The pattern transformer includes a primary winding having a wound printed pattern wiring provided in each of a first plane region and a second plane region of the multilayer substrate, and a secondary winding disposed at a different position from the primary winding in a layer direction and having a wound printed pattern wiring provided in each of the first plane region and the second plane region of the multilayer substrate. The primary winding and the secondary winding are electromagnetically coupled and are configured such that a current flows clockwise through one of the wound printed pattern wiring provided in the first plane region or the wound printed pattern wiring provided in the second plane region while a current flows counterclockwise through the other.

Advantageous Effects

The present disclosure provides a signal transmission circuit with a compact design.

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Configuration of Signal Transmission Circuit)

Figure 1:
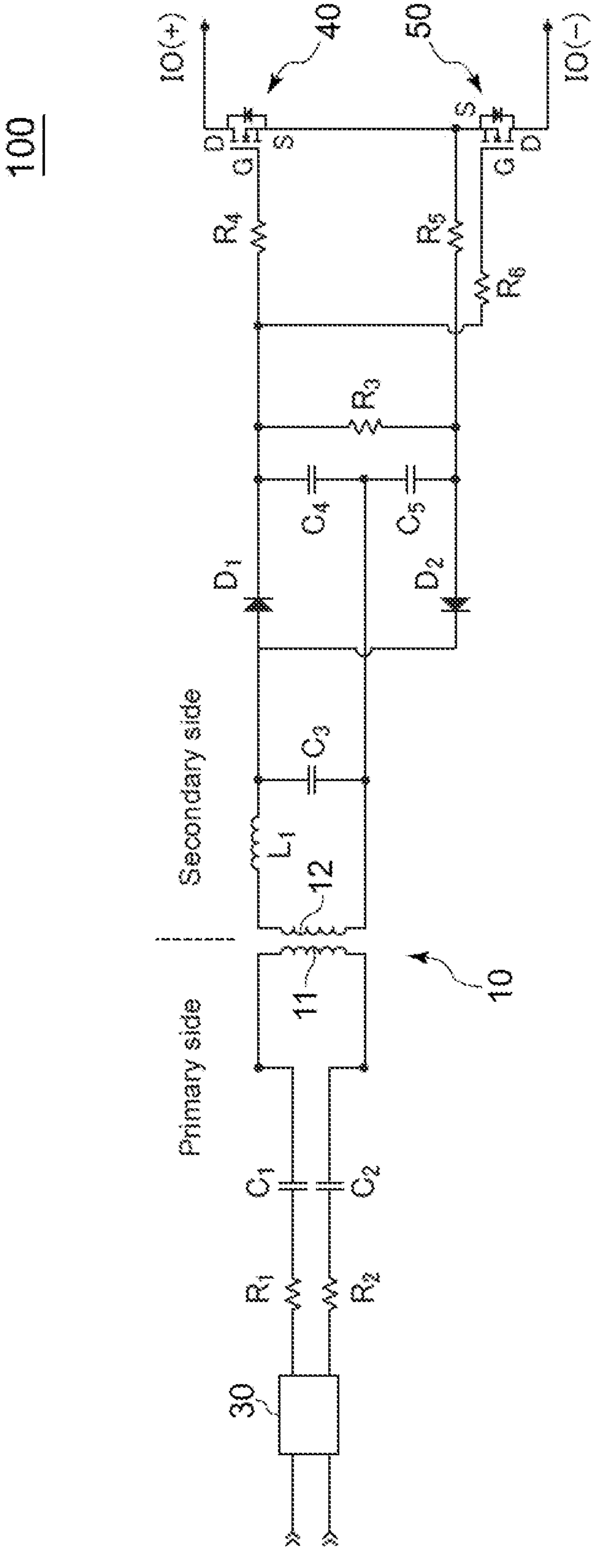
FIG. 1 is a configuration diagram of a signal transmission circuit according to an embodiment of the present disclosure.

A configuration of a signal transmission circuit 100 according to an embodiment of the present disclosure will be described with reference to FIG. 1. The signal transmission circuit 100 is a circuit for transmitting an isolation signal. FIG. 1 is a configuration diagram of the signal transmission circuit 100 according to an embodiment of the present disclosure.

As shown in FIG. 1, the signal transmission circuit 100 includes a pattern transformer 10 and FETs 40, 50 as one or more semiconductor switching elements. The pattern transformer 10 functions in the same manner as a normal transformer. A detailed configuration of the pattern transformer 10 will be described later. The FETs 40, 50 are two N-type MOSFETs (Metal-Oxide-Semiconductor Field-Effective Transistor). The source (S) terminal of the FET 40 is connected to the source (S) terminal of the FET 50.

The one or more semiconductor switching elements included in the signal transmission circuit 100 may not be MOSFETs but JFETs (Junction Field-Effect Transistor) or other transistors. Further, the one or more semiconductor switching elements included in the signal transmission circuit 100 are not limited to two semiconductor switching elements but may be one semiconductor switching element or three or more semiconductor switching elements.

A buffer 30 (buffer amplifier) is provided on the input side of the signal transmission circuit 100. For example, a pulse signal that alternates between +3.3V and 0V is input to the positive input terminal of the buffer 30. For example, a pulse signal that alternates between 0V and −3.3V is input to the negative input terminal of the buffer 30. As a result, an AC voltage with a pulse waveform of 6.6V in total is applied between the positive and negative input terminals of the buffer 30.

The input voltage to the buffer 30 is not limited thereto. For example, it may be a sinusoidal AC voltage. Further, the pulse signal input to the buffer 30 may be, for example, a signal generated by PWM (Pulse Width Modulation) control of FPGA (Field-Programmable Gate Array).

The positive output terminal of the buffer 30 is connected to one end of a resistor $R_1$, and the other end of the resistor $R_1$ is connected to one end of a capacitor $C_1$. The negative output terminal of the buffer 30 is connected to one end of a resistor $R_2$, and the other end of the resistor $R_2$ is connected to one end of a capacitor $C_2$. The resistor $R_1$ and the resistor $R_2$ are designed to have resistance values to prevent overload.

The other end of the capacitor $C_1$ is connected to the positive terminal of the primary winding 11 of the pattern transformer 10. The other end of the capacitor $C_2$ is connected to the negative terminal of the primary winding 11 of the pattern transformer 10. The capacitor $C_1$ and capacitor $C_2$ remove a direct current component of the input signal. Accordingly, an AC voltage from which the DC component is removed is applied to the primary winding 11 of the pattern transformer 10.

The positive terminal of the secondary winding 12 of the pattern transformer 10 is connected to one end of a coil $L_1$. The other end of the coil $L_1$ is connected to one end of a capacitor $C_3$. The other end of the capacitor $C_3$ is connected to the negative terminal of the secondary winding 12 of the pattern transformer 10.

Thus, one secondary-side end of the pattern transformer 10 is connected to one end of the coil $L_1$, the other end of the coil $L_1$ is connected to one end of the first capacitor (capacitor $C_3$), and the other end of the first capacitor (capacitor $C_3$) is connected to the other secondary-side end of the pattern transformer 10. Further, one primary-side end of the pattern transformer 10 is connected to the second capacitor (capacitor $C_1$), and the other primary-side end of the pattern transformer 10 is connected to the third capacitor (capacitor $C_2$).

Here, the coil $L_1$ and the first capacitor (capacitor $C_3$) are designed to form a resonance circuit which resonates with an AC signal output from the secondary side of the pattern transformer 10. Specifically, the parameters of the inductance of the coil $L_1$ and the capacitance of the capacitor $C_3$ are designed to form a resonance circuit having a frequency close to the frequency of the AC signal output from the secondary side of the pattern transformer 10 as the resonance frequency. The resonance of the resonance circuit compensates for the voltage drop on the secondary side due to the loss in the pattern transformer 10.

The second capacitor (capacitor $C_1$) and the third capacitor (capacitor $C_2$) are configured to resonate in combination with the inductance component of the primary winding of the pattern transformer 10. That is, the circuit is configured such that RLC resonance occurs on both the primary side and the secondary side of the pattern transformer 10.

Further, the parameters of the second capacitor (capacitor $C_1$) and the third capacitor (capacitor $C_2$) are designed to have a capacitance that acts to increase the full width at half maximum of the resonant circuit formed by the coil $L_1$ and the first capacitor (capacitor $C_3$). In this case, since the full width at half maximum of the resonant circuit is increased, the reduction in the resonance effect can be suppressed even if there is a slight difference between the resonance frequency of the resonance circuit and the frequency of the AC signal due to parameters of the elements.

One end of the capacitor $C_3$ is connected to an anode terminal of a diode $D_1$. A cathode terminal of the diode $D_1$ is connected to one end of a capacitor $C_4$. The other end of the capacitor $C_4$ is connected to the other end of the capacitor $C_3$. They constitute a first rectifier circuit which rectifies the half-wave portion of the AC voltage which is the secondary voltage of the pattern transformer 10.

The other end of the capacitor $C_3$ is connected to one end of a capacitor $C_5$. The other end of the capacitor $C_5$ is connected to an anode terminal of a diode $D_2$. A cathode terminal of the diode $D_2$ is connected to the anode terminal of the diode $D_1$. They constitute a second rectifier circuit which rectifies the half-wave portion of the AC voltage which is the secondary voltage of the pattern transformer 10.

The other end of the capacitor $C_4$ and one end of the capacitor $C_5$ are connected to the negative terminal of the secondary winding 12 of the pattern transformer 10. Therefore, the charging voltage of the capacitor $C_4$ and the capacitor $C_5$ is a DC voltage that is full-wave rectified by the first rectifier circuit and the second rectifier circuit.

One end of the capacitor $C_4$ is connected to one end of a resistor $R_3$. The other end of the resistor $R_3$ is connected to the other end of the capacitor $C_5$. The parameter of the resistor $R_3$ is designed to have a resistance value suitable for discharging the charging voltage of the capacitor $C_4$ and the capacitor $C_5$.

One end of the resistor $R_3$ is connected to one end of a resistor $R_4$ and one end of a resistor $R_6$. The other end of the resistor $R_4$ is connected to the gate (G) terminal of the FET 40. The other end of the resistor $R_6$ is connected to the gate (G) terminal of the FET 50. The other end of the resistor $R_3$ is connected to one end of the resistor $R_5$. The other end of the resistor $R_5$ is connected to the source (S) terminal of the FET 40 and the source (S) terminal of the FET 50.

The drain (D) terminal of the FET 40 is connected to the positive output terminal of the signal transmission circuit 100. The drain (D) terminal of the FET 50 is connected to the negative output terminal of the signal transmission circuit 100. The FETs 40 and 50 are switched as the voltage between the gate (G) terminal and the source (S) terminal changes according to the secondary voltage of the pattern transformer 10.

In this way, one or more semiconductor switching elements (e.g., FETs 40 and 50) provided on the secondary side of the pattern transformer 10 are configured to be turned on and off by the secondary voltage of the pattern transformer 10 and to output a contact output signal. In the above configuration, the FETs 40 and 50 with the source (S) terminals connected to each other are advantageous in that they can output a non-polar contact output signal. That is, since such a signal transmission circuit 100 outputs a contact signal without restrictions on the positive and negative sides as the IO module, an electromagnetic valve that operates with an AC voltage can also be turned on and off.

(Configuration of Pattern Transformer 10)

Figure 2:
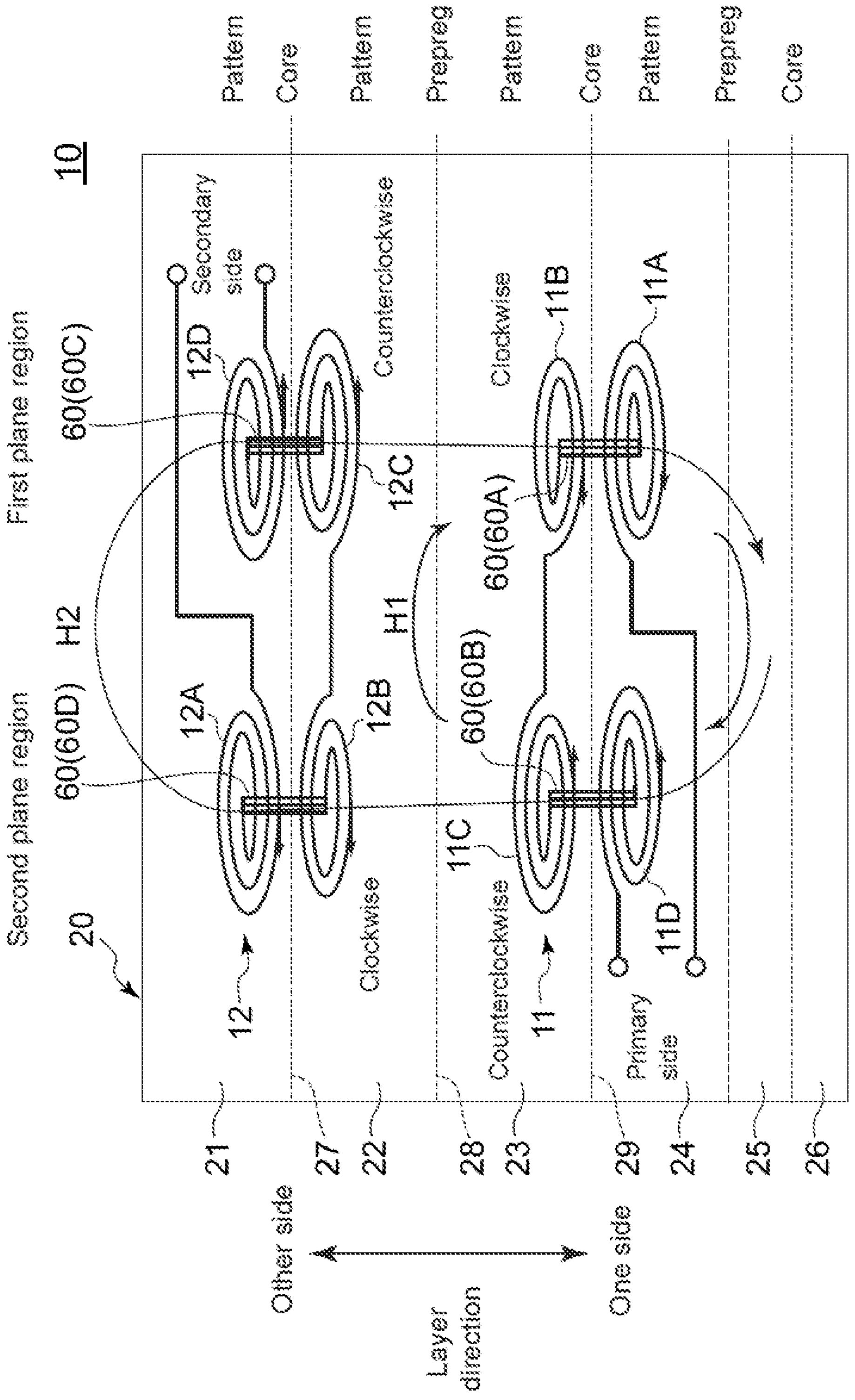
FIG. 2 is a schematic configuration diagram of a pattern transformer according to an embodiment.

A configuration of the pattern transformer 10 according to an embodiment will be described with reference to FIGS. 2 to 5. FIG. 2 is a schematic configuration diagram of the pattern transformer 10 according to an embodiment. As shown in FIG. 2, the pattern transformer 10 is disposed on the multilayer substrate 20 including a plurality of layers.

The plurality of layers of the multilayer substrate 20 includes a first pattern layer 21, a second pattern layer 22, a third pattern layer 23, and a fourth pattern layer 24. The printed pattern wiring is formed in these layers. The second pattern layer 22 is formed on one side of the first pattern layer 21. The third pattern layer 23 is formed on one side of the second pattern layer 22. The fourth pattern layer 24 is formed on one side of the third pattern layer 23.

In the example shown in FIG. 2, the one side is the lower side in the vertical direction (layer direction) in the figure, and the other side is the upper side in the vertical direction. The one side of the first pattern layer 21 and the other side of the second pattern layer 22 face each other. The one side of the second pattern layer 22 and the other side of the third pattern layer 23 face each other. The one side of the third pattern layer 23 and the other side of the fourth pattern layer 24 face each other. Thus, the layers are arranged in the layer direction.

The plurality of layers of the multilayer substrate 20 further includes a first insulating layer 27 (core layer) disposed between the first pattern layer 21 and the second pattern layer 22, a second insulating layer 28 (prepreg layer) disposed between the second pattern layer 22 and the third pattern layer 23, and a third insulating layer 29 (core layer) disposed between the third pattern layer 23 and the fourth pattern layer 24. These layers are insulating layers having insulating property.

The first insulating layer 27 and the third insulating layer 29 are provided with connection portions 60 for connecting printed pattern wirings adjacent to each other in the layer direction. The connection portions 60 include a first connection portion 60 (60A, 60C) disposed in the first plane region and a second connection portion 60 (60B, 60D) disposed in the second plane region. On the other hand, the second insulating layer 28 (prepreg layer) is provided with no connection portion 60.

The connection portion 60 is formed, for example, by injecting a conductive material into a through hole provided in each of the first insulating layer 27 and the third insulating layer 29. The connection portion 60 may be a conductor formed to pass through each of the first insulating layer 27 and the third insulating layer 29.

The first pattern layer 21, the second pattern layer 22, the third pattern layer 23, and the fourth pattern layer 24 are designed to have a thickness of, for example, 0.018 mm. The prepreg layer is preferably thicker than the core layer. For example, the thicknesses of the first insulating layer 27 and the third insulating layer 29 may be 0.1 mm, while the thickness of the second insulating layer 28 may be 0.3 mm. In this case, it is possible to easily connect the printed pattern wirings by the connection portion 60 while ensuring the insulating properties of the primary winding 11 and the secondary winding 12.

As in the example shown in FIG. 2, the multilayer substrate 20 may further include, in addition to the four pattern layers and three insulating layers, a fifth pattern layer 25, a sixth pattern layer 26, a fourth insulating layer (prepreg layer), and a fifth insulating layer (core layer). For example, the thickness of the fourth insulating layer (prepreg layer) may be 0.6 mm, and the thickness of the fifth insulating layer (core layer) may be 0.1 mm.

As shown in FIG. 2, the pattern transformer 10 includes a primary winding 11 having a wound printed pattern wiring provided in each of the first plane region and the second plane region of the multilayer substrate 20, and a secondary winding 12 disposed at a different position from the primary winding 11 in the layer direction and having a wound printed pattern wiring provided in each of the first plane region and the second plane region of the multilayer substrate 20. The primary winding 11 and the secondary winding 12 are configured to be electromagnetically coupled.

The first plane region and the second plane region are regions including the respective connection portions 60. The first plane region and the second plane region are different plane regions and preferably do not overlap with each other. The expression "provided in the first plane region" means "provided so as to overlap at least a part of the first plane region". The same applies to the expression "provided in the second plane region". In other words, the printed pattern wiring of the primary winding 11 and the printed pattern wiring of the secondary winding 12 may be displaced in plan view as long as they partially overlap.

As shown in FIG. 2, the printed pattern wiring of the primary winding 11 is formed in the third pattern layer 23 and the fourth pattern layer 24. The printed pattern wiring of the primary winding 11 includes a first winding portion 11A, a second winding portion 11B, a third winding portion 11C, and a fourth winding portion 11D.

The first winding portion 11A is, starting from the positive end, wound clockwise and spirally inward around the first connection portion 60 (60A) of the third insulating layer 29 and extends to be connected to the first connection portion 60 (60A), in the first plane region of the fourth pattern layer 24. The second winding portion 11B is connected to the first winding portion 11A via the first connection portion 60 (60A) and, starting from the first connection portion 60 (60A) in the third pattern layer 23, wound clockwise and spirally outward around the first connection portion 60 (60A), in the first plane region of the third pattern layer 23.

The third winding portion 11C is connected to the negative end of the second winding portion 11B, and, starting from the negative end of the second winding portion 11B, wound counterclockwise and spirally inward around the second connection portion 60 (60B) and extends to be connected to the second connection portion 60 (60B), in the second plane region of the third pattern layer 23. The fourth winding portion 11D is connected to the third winding portion 11C via the second connection portion 60 (60B) and, starting from the second connection portion 60 (60B) in the fourth pattern layer 24, wound counterclockwise and spirally outward around the second connection portion 60 (60B), and connected to the negative end, in the second plane region of the fourth pattern layer 24.

As shown in FIG. 2, the printed pattern wiring of the secondary winding 12 is formed in the first pattern layer 21 and the second pattern layer 22. The printed pattern wiring of the secondary winding 12 includes a fifth winding portion 12A, a sixth winding portion 12B, a seventh winding portion 12C, and an eighth winding portion 12D.

The fifth winding portion 12A is, starting from the positive end, wound clockwise and spirally inward around the second connection portion 60 (60D) of the first insulating layer 27 and extends to be connected to the second connection portion 60 (60D), in the second plane region of the first pattern layer 21. The sixth winding portion 12B is connected to the fifth winding portion 12A via the second connection portion 60 (60D) and, starting from the second connection portion 60 (60D) in the second pattern layer 22, wound clockwise and spirally outward around the second connection portion 60 (60D), in the second plane region of the second pattern layer 22.

The seventh winding portion 12C is connected to the negative end of the sixth winding portion 12B, and, starting from the negative end of the sixth winding portion 12B, wound counterclockwise and spirally inward around the first connection portion 60 (60C) and extends to be connected to the first connection portion 60 (60C), in the first plane region of the second pattern layer 22. The eighth winding portion 12D is connected to the seventh winding portion 12C via the first connection portion 60 (60C) and, starting from the first connection portion 60 (60C) in the first pattern layer 21, wound counterclockwise and spirally outward around the first connection portion 60 (60C), and connected to the negative end, in the first plane region of the first pattern layer 21.

Figure 3:
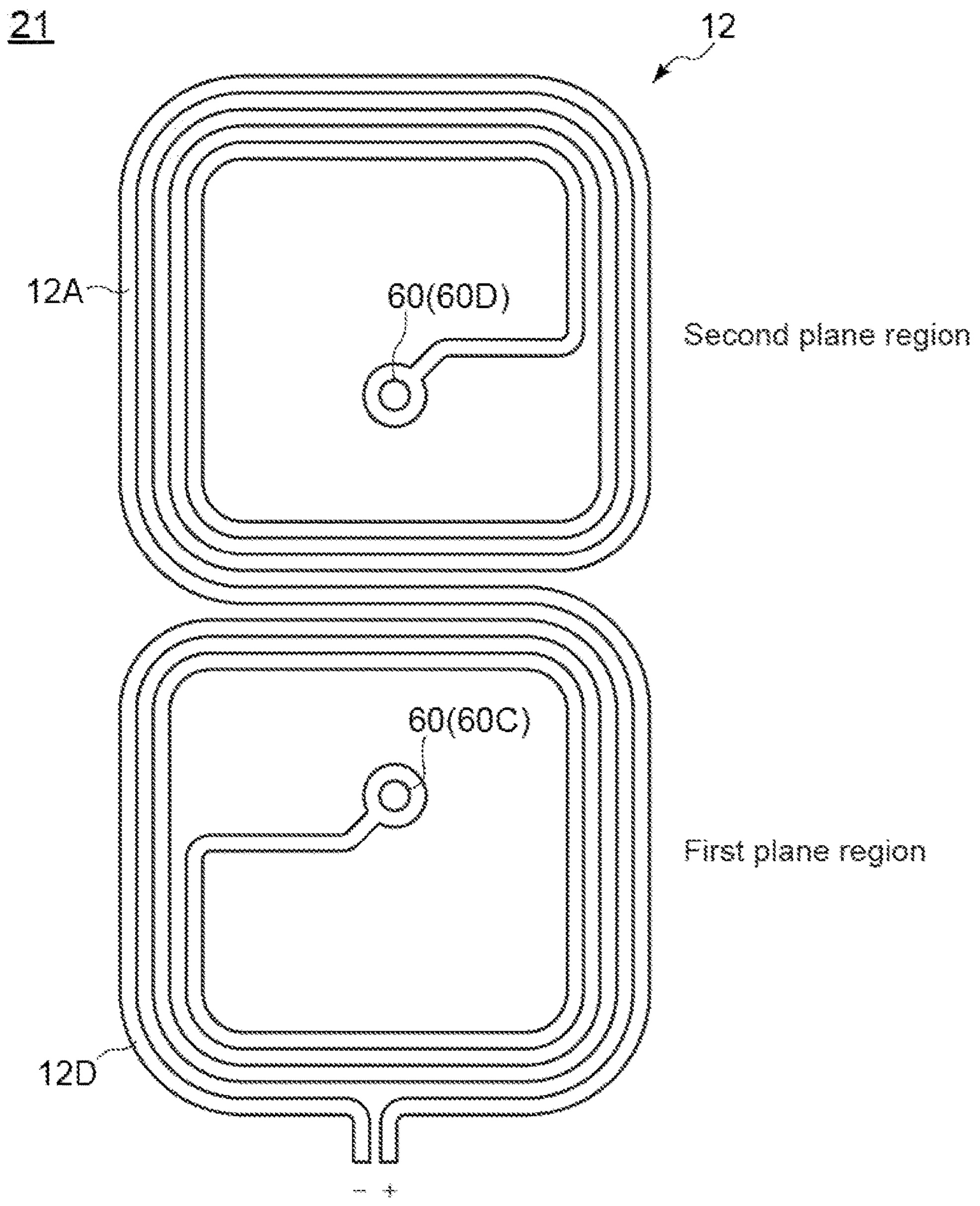
FIG. 3 is a schematic plan view of a printed pattern wiring in a first pattern layer of a pattern transformer according to an embodiment.
Figure 4:
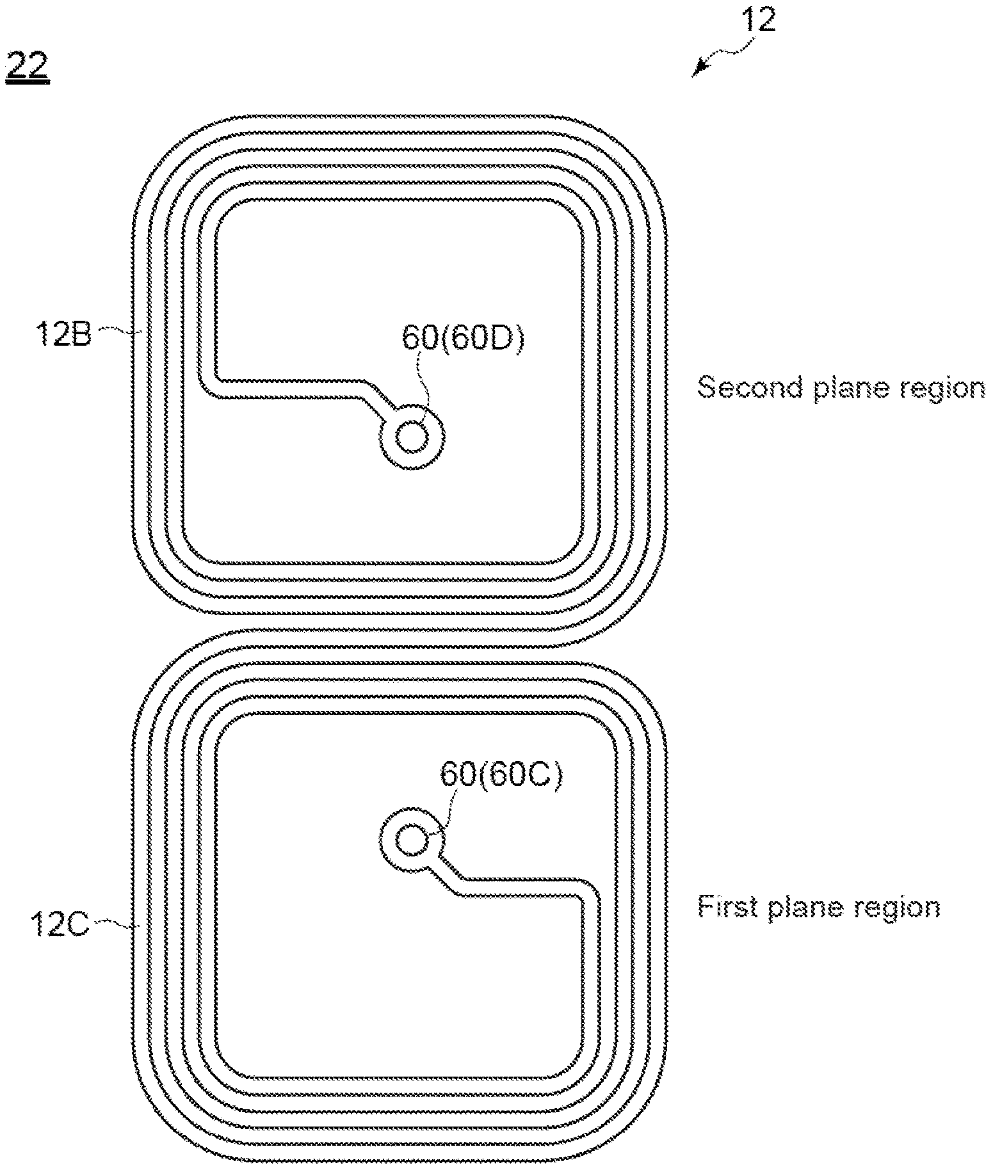
FIG. 4 is a schematic plan view of a printed pattern wiring in a second pattern layer of a pattern transformer according to an embodiment.
Figure 5:
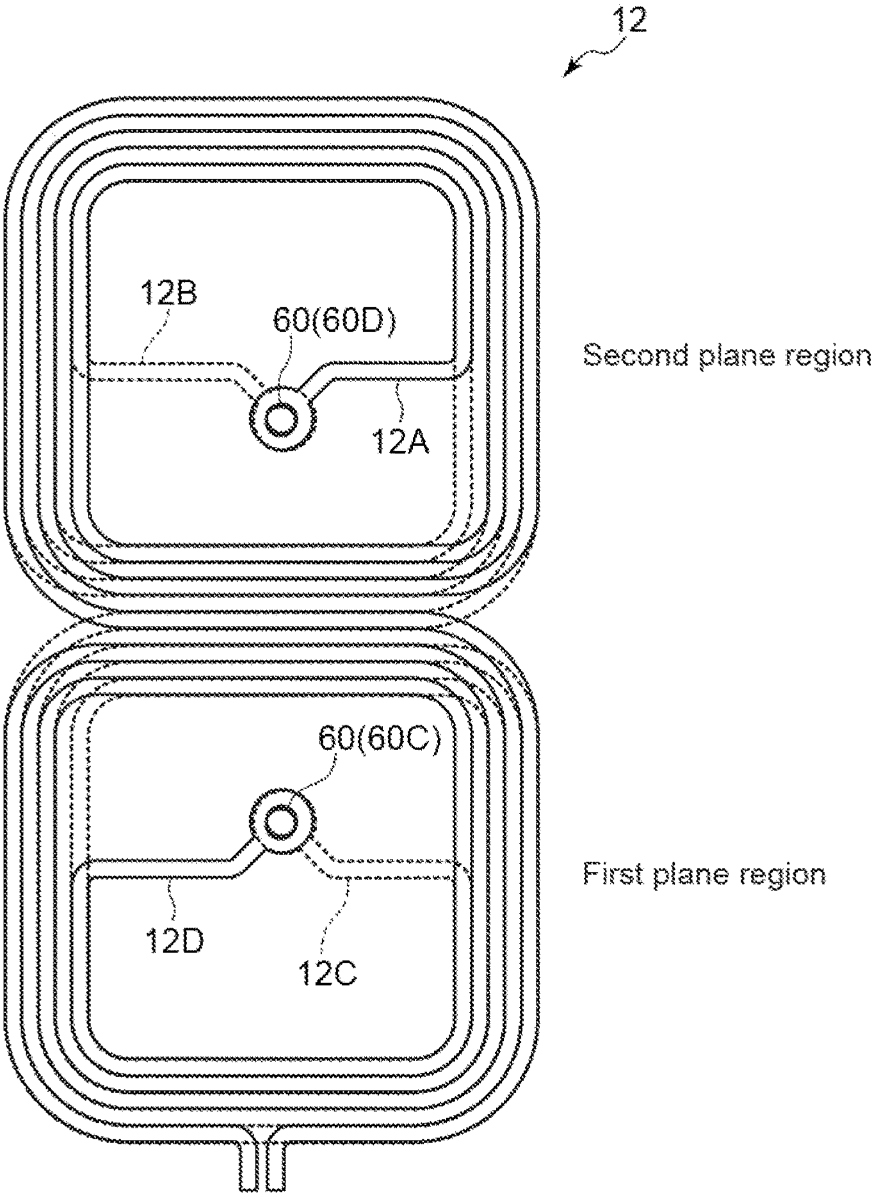
FIG. 5 is a schematic plane view of a secondary winding of a pattern transformer according to an embodiment.

Hereinafter, the printed pattern wiring of the pattern transformer 10 will be described in a different view from FIG. 2. FIG. 3 is a schematic plan view of the printed pattern wiring in the first pattern layer 21 of the pattern transformer 10 according to an embodiment. Here, the secondary winding 12 will be described separately for the first pattern layer 21 and the second pattern layer 22. FIG. 4 is a schematic plan view of the printed pattern wiring in the second pattern layer 22 of the pattern transformer 10 according to an embodiment. FIG. 5 is a schematic plane view of the secondary winding 12 of the pattern transformer 10 according to an embodiment. FIG. 5 shows a state where the winding portions of the secondary winding 12 are superimposed through the multilayer substrate 20.

As shown in FIGS. 2 to 5, the fifth winding portion 12A in the second plane region and the eighth winding portion 12D in the first plane region are formed in the first pattern layer 21, and the sixth winding portion 12B in the second plane region and the seventh winding portion 12C in the first plane region are formed in the second pattern layer 22. Further, the fifth winding portion 12A and the eighth winding portion 12D are connected to the sixth winding portion 12B and the seventh winding portion 12C, respectively, via the connection portions 60. Since the secondary winding 12 is formed by connecting the winding portions disposed in two pattern layers, the number of turns per unit area can be increased, as compared with the configuration in which the secondary winding 12 is formed only in one pattern layer.

The primary winding 11 is also formed by connecting the winding portions disposed in the third pattern layer 23 and the fourth pattern layer 24, as with the secondary winding 12 shown in FIGS. 3 to 5. Further, the primary winding 11 and the secondary winding 12 are superimposed as shown in FIGS. 2 and 5.

(Operation Principle of Pattern Transformer 10)

The operation of the pattern transformer 10 when an AC voltage is applied to the pattern transformer 10 so that a current flows from the positive side of the primary winding 11 will be described. First, in the primary winding 11 and the secondary winding 12, a current flows clockwise through one of the wound printed pattern wiring provided in the first plane region or the wound printed pattern wiring provided in the second plane region while a current flows counterclockwise through the other.

For example, as shown in FIG. 2, a current flows from the positive side of the primary winding 11 to the first winding portion 11A and flows clockwise through the first winding portion 11A. This current flows to the second winding portion 11B via the connection portion 60 and flows clockwise through the second winding portion 11B. Further, the current flows from the second winding portion 11B to the third winding portion 11C and flows counterclockwise through the third winding portion 11C. This current flows to the fourth winding portion 11D via the connection portion 60 and flows counterclockwise through the fourth winding portion 11D.

According to the above configuration, a current flows in opposite directions in the wound printed pattern wiring provided in the first plane region and the wound printed pattern wiring provided in the second plane region. Accordingly, magnetic circuits H1, H2 are formed between the two wound printed wirings. The magnetic circuit H1 is a magnetic circuit of the magnetic flux in the primary winding 11, and the magnetic circuit H2 is a magnetic circuit of the magnetic flux due to the magnetic coupling between the primary winding 11 and the secondary winding 12. The magnetic flux generated by an induced current of the secondary winding 12 is also formed in the same manner as the magnetic circuit H1.

The magnetic circuits H1, H2 guide the magnetic flux so as to reduce the leakage flux from the winding in a plane region outside the winding. Therefore, a compact design can be achieved by adopting a configuration without a core.

Additionally, since the primary winding 11 and the secondary winding 12 have the wound printed pattern wirings in the same plane region, they can be electromagnetically coupled. For example, as shown in FIG. 2, when a current flows through the primary winding 11, the magnetic circuit H2 is formed, and the magnetic flux generated in the primary winding 11 is interlinked with the secondary winding 12. As a result, a current flows through the secondary winding 12 due to the electromagnetic induction of an AC current flowing through the primary winding 11. Thus, the pattern transformer 10 functions as a transformer.

For example, as shown in FIG. 2, due to the electromagnetic induction accompanied with the change in magnetic flux generated in the primary winding 11, a current flows from the positive side of the secondary winding 12 to the fifth winding portion 12A and flows clockwise through the fifth winding portion 12A. This current flows to the sixth winding portion 12B via the connection portion 60 and flows clockwise through the sixth winding portion 12B. Further, the current flows from the sixth winding portion 12B to the seventh winding portion 12C and flows counterclockwise through the seventh winding portion 12C. This current flows to the eighth winding portion 12D via the connection portion 60 and flows counterclockwise through the eighth winding portion 12D.

As described above, the primary winding 11 is configured such that a current flows clockwise through the wound printed pattern wiring provided in the first plane region while a current flows counterclockwise through the wound printed pattern wiring provided in the second plane region. Further, the secondary winding 12 is configured such that a current flows counterclockwise through the wound printed pattern wiring provided in the first plane region while a current flows clockwise through the wound printed pattern wiring provided in the second plane region. When the polarity of the AC voltage is reversed, a current flows in the opposite direction to that described above.

(Modification)

The present disclosure is not limited to the embodiments described above, but includes modifications to the embodiments described above, and embodiments composed of combinations of those embodiments.

In the above-described embodiment, the primary winding 11 and the secondary winding 12 of the pattern transformer 10 are provided over two pattern layers via the connection portions 60. However, the pattern transformer 10 is not limited to this configuration. The primary winding 11 and the secondary winding 12 may be provided over three or more pattern layers via the connection portions 60, or may be provided on one pattern layer.

In the above-described embodiment, the primary winding 11 and the secondary winding 12 of the pattern transformer 10 have winding portions in each of the first plane region and the second plane region. However, the pattern transformer 10 is not limited to this configuration. The primary winding 11 and the secondary winding 12 may have winding portions in three or more plane regions. That is, the magnetic circuit may be more complicated. However, the primary winding 11 and the secondary winding 12 are preferably designed to reduce the magnetic flux generated by the currents in the windings in a region outside the plane regions.

In FIG. 2, the primary winding 11 is disposed below the secondary winding 12, and the primary winding 11 is provided in the third pattern layer 23 and the fourth pattern layer 24. However, the primary winding 11 may be disposed above the secondary winding 12, and the primary winding 11 may be provided in the first pattern layer 21 and the second pattern layer 22. That is, the positional relationship may be reversed as long as they overlap in the layer direction.

The number of turns of the primary winding 11 and the secondary winding 12 is not limited to the illustrated example, but can be freely designed. The turn ratio can also be freely designed.

CONCLUSION

The contents described in the above embodiments would be understood as follows, for instance.

(1) A signal transmission circuit (100) according to an embodiment of the present disclosure is a signal transmission circuit (100) for transmitting an insulation signal, comprising: a multilayer substrate (20) including a plurality of layers; and a pattern transformer (10) disposed on the multilayer substrate (20). The pattern transformer (10) includes a primary winding (11) having a wound printed pattern wiring provided in each of a first plane region and a second plane region of the multilayer substrate (20), and a secondary winding (12) disposed at a different position from the primary winding (11) in a layer direction and having a wound printed pattern wiring provided in each of the first plane region and the second plane region of the multilayer substrate (20). The primary winding (11) and the secondary winding (12) are electromagnetically coupled and are configured such that a current flows clockwise through one of the wound printed pattern wiring provided in the first plane region or the wound printed pattern wiring provided in the second plane region while a current flows counterclockwise through the other.

According to the configuration described in (1), a current flows in opposite directions in the wound printed pattern wiring provided in the first plane region and the wound printed pattern wiring provided in the second plane region. Accordingly, magnetic circuits (H1, H2) are formed between the two wound printed wirings. The magnetic circuits (H1, H2) guide the magnetic flux so as to reduce the leakage flux from the winding in a plane region outside the winding. Therefore, a compact design can be achieved by adopting a configuration without a core. Additionally, since the primary winding (11) and the secondary winding (12) have the wound printed pattern wirings in the same plane region, they can be electromagnetically coupled.

(2) In some embodiments, in the above configuration (1), the primary winding (11) is configured such that a current flows clockwise through the wound printed pattern wiring provided in the first plane region while a current flows counterclockwise through the wound printed pattern wiring provided in the second plane region. The secondary winding (12) is configured such that a current flows counterclockwise through the wound printed pattern wiring provided in the first plane region while a current flows clockwise through the wound printed pattern wiring provided in the second plane region.

A current flows through the secondary winding (12) due to the electromagnetic induction of a current flowing through the primary winding (11). Thus, the pattern transformer (10) functions as a transformer.

(3) In some embodiments, in the above configuration (1) or (2), one or more semiconductor switching elements (e.g., FETs 40, 50 shown in FIG. 1) are disposed on a secondary side of the pattern transformer (10). The one or more semiconductor switching elements (e.g., FETs 40, 50 shown in FIG. 1) are configured to be turned on and off by a secondary voltage of the pattern transformer (10) and output a contact output signal.

According to the configuration described in (3), by controlling the current or voltage on the primary side of the pattern transformer (10), the semiconductor switching elements (e.g., FETs 40, 50 in FIG. 1) disposed on the secondary side of the pattern transformer (10) can be turned on and off to output a contact output signal.

(4) In some embodiments, in any one of the above configurations (1) to (3), one secondary-side end of the pattern transformer (10) is connected to one end of a coil (coil $L_1$), another end of the coil (coil $L_1$) is connected to one end of a first capacitor (capacitor $C_3$), and another end of the first capacitor (capacitor $C_3$) is connected to another secondary-side end of the pattern transformer (10). The coil (coil $L_1$) and the first capacitor (capacitor $C_3$) form a resonance circuit which resonates with an AC signal output from a secondary side of the pattern transformer (10).

According to the configuration described in (4), the resonance of the resonance circuit compensates for the voltage drop on the secondary side due to the loss in the pattern transformer (10).

(5) In some embodiments, in the above configuration (4), one primary-side end of the pattern transformer (10) is connected to a second capacitor (e.g., capacitor $C_1$ in FIG. 1), and another primary-side end of the pattern transformer (10) is connected to a third capacitor (e.g., capacitor $C_2$ in FIG. 1). The second capacitor (e.g., capacitor $C_1$ in FIG. 1) and the third capacitor (e.g., capacitor $C_2$ in FIG. 1) have a capacitance that acts to increase full width at half maximum of the resonant circuit.

According to the configuration described in (5), since the full width at half maximum of the resonant circuit is increased, the reduction in the resonance effect can be suppressed even if there is a slight difference between the resonance frequency of the resonance circuit and the frequency of the AC signal due to parameters of the elements.

(6) In some embodiments, in any one of the above configurations (1) to (5), the plurality of layers includes: a first pattern layer (21) with the printed pattern wiring; a second pattern layer (22) with the printed pattern wiring formed on one side of the first pattern layer (21); a third pattern layer (23) with the printed pattern wiring formed on one side of the second pattern layer (22); a fourth pattern layer (24) with the printed pattern wiring formed on one side of the third pattern layer (23); a first insulating layer (27) having insulating property and disposed between the first pattern layer (21) and the second pattern layer (22); a second insulating layer (28) having insulating property and disposed between the second pattern layer (22) and the third pattern layer (23); and a third insulating layer (29) having insulating property and disposed between the third pattern layer (23) and the fourth pattern layer (24). The first insulating layer (27) and the third insulating layer (29) are provided with connection portions (60), including a first connection portion (60A, 60C) disposed in the first plane region and a second connection portion (60B, 60D) disposed in the second plane region, for connecting the printed pattern wirings adjacent to each other in the layer direction.

According to the configuration described in (6), using the connection portions (60), the primary winding (11) is formed by extending the printed pattern wiring to the third pattern layer (23) and fourth pattern layer (24), and the secondary winding (12) is formed by extending the printed pattern wiring to the first pattern layer (21) and second pattern layer (22). Further, the primary winding (11) and the secondary winding (12) can be insulated by the second insulating layer (28). Therefore, it is suitable for forming the pattern transformer (10).

(7) In some embodiments, in the above configuration (6), the printed pattern wiring of the primary winding (11) is formed in the third pattern layer (23) and the fourth pattern layer (24). The printed pattern wiring of the primary winding (11) includes: a first winding portion (11A) which is, starting from a positive end, wound clockwise and spirally inward around the first connection portion (60A) of the third insulating layer (23) and extending to be connected to the first connection portion (60A), in the first plane region of the fourth pattern layer (24); a second winding portion (11B) which is connected to the first winding portion (11A) via the first connection portion (60A) and, starting from the first connection portion (60A) in the third pattern layer (23), wound clockwise and spirally outward around the first connection portion (60A), in the first plane region of the third pattern layer (23); a third winding portion (11C) which is connected to a negative end of the second winding portion (11B), and, starting from the negative end of the second winding portion (11B), wound counterclockwise and spirally inward around the second connection portion (60B) and extending to be connected to the second connection portion (60B), in the second plane region of the third pattern layer (23); and a fourth winding portion (11D) which is connected to the third winding portion (11C) via the second connection portion (60B) and, starting from the second connection portion (60B) in the fourth pattern layer (24), wound counterclockwise and spirally outward around the second connection portion (60B), and connected to a negative end, in the second plane region of the fourth pattern layer (24).

According to the configuration described in (7), since four winding portions can be formed by a continuous printed wiring pattern, the primary winding (11) can be easily formed.

(8) In some embodiments, in the above configuration (6) or (7), the printed pattern wiring of the secondary winding (12) is formed in the first pattern layer (21) and the second pattern layer (22). The printed pattern wiring of the secondary winding (12) includes: a fifth winding portion (12A) which is, starting from a positive end, wound clockwise and spirally inward around the second connection portion (60D) of the first insulating layer (27) and extending to be connected to the second connection portion (60D), in the second plane region of the first pattern layer (21); a sixth winding portion (12B) which is connected to the fifth winding portion (12A) via the second connection portion (60D) and, starting from the second connection portion (60D) in the second pattern layer (22), wound clockwise and spirally outward around the second connection portion (60D), in the second plane region of the second pattern layer (22); a seventh winding portion (12C) which is connected to a negative end of the sixth winding portion (12B), and, starting from the negative end of the sixth winding portion (12B), wound counterclockwise and spirally inward around the first connection portion (60C) and extending to be connected to the first connection portion (60C), in the first plane region of the second pattern layer (22); and an eighth winding portion (12D) which is connected to the seventh winding portion (12C) via the first connection portion (60C) and, starting from the first connection portion (60C) in the first pattern layer (21), wound counterclockwise and spirally outward around the first connection portion (60C), and connected to a negative end, in the first plane region of the first pattern layer (21).

According to the configuration described in (8), since four winding portions can be formed by a continuous printed wiring pattern, the secondary winding (12) can be easily formed.

REFERENCE SIGNS LIST

10 Pattern transformer
11 Primary winding
11A First winding portion
11B Second winding portion
11C Third winding portion
11D Fourth winding portion
12 Secondary winding
12A Fifth winding portion
12B Sixth winding portion
12C Seventh winding portion
12D Eighth winding portion
20 Multilayer substrate
21 First pattern layer
22 Second pattern layer
23 Third pattern layer
24 Fourth pattern layer
25 Fifth pattern layer
26 Sixth pattern layer
27 First insulating layer
28 Second insulating layer
29 Third insulating layer
30 Buffer
60 Connection portion
60A, 60C First connection portion
60B, 60D Second connection portion
100 Signal transmission circuit
$C_1$, $C_2$, $C_3$, $C_4$, $C_5$ Capacitor
$D_1$, $D_2$ Diode
$H_1$, $H_2$ Magnetic circuit
$L_1$ Coil
$R_1$, $R_2$, $R_3$, $R_4$, $R_5$, $R_6$ Resistor

The invention claimed is:

1. A signal transmission circuit for transmitting an insulation signal, comprising:

a multilayer substrate including a plurality of layers that are always connected to one another; and a pattern transformer disposed on the multilayer substrate, wherein the pattern transformer includes a primary winding having a wound printed pattern wiring provided in each of a first plane region and a second plane region of the multilayer substrate, and a secondary winding disposed at a different position from the primary winding in a layer direction and having a wound printed pattern wiring provided in each of the first plane region and the second plane region of the multilayer substrate, wherein the primary winding and the secondary winding are electromagnetically coupled, and wherein the primary winding and the secondary winding are configured such that a current flows clockwise through one of the wound printed pattern wiring provided in the first plane region or the wound printed pattern wiring provided in the second plane region while a current flows counterclockwise through the other one of the wound printed pattern wiring provided in the first plane region or the wound printed pattern wiring provided in the second plane region, wherein the plurality of layers includes: a first pattern layer with the printed pattern wiring of the secondary winding; a second pattern layer with the printed pattern wiring of the secondary winding formed on one side of the first pattern layer; a third pattern layer with the printed pattern wiring of the primary winding formed on one side of the second pattern layer; a fourth pattern layer with the printed pattern wiring of the primary winding formed on one side of the third pattern layer;

a first insulating layer disposed between the first pattern layer and the second pattern layer; a second insulating layer disposed between the second pattern layer and the third pattern layer; and a third insulating layer disposed between the third pattern layer and the fourth pattern layer, and wherein the first insulating layer and the third insulating layer are provided with connection portions, including a first connection portion disposed in the first plane region and a second connection portion disposed in the second plane region, for connecting the printed pattern wirings adjacent to each other in the layer direction;

wherein the printed pattern wiring of the primary winding is formed in the third pattern layer and the fourth pattern layer, and wherein the printed pattern wiring of the primary winding includes: a first winding portion which is, starting from a positive end, wound clockwise and spirally inward around the first connection portion of the third insulating layer and extending to be connected to the first connection portion, in the first plane region of the fourth pattern layer; a second winding portion which is connected to the first winding portion via the first connection portion and, starting from the first connection portion in the third pattern layer, wound clockwise and spirally outward around the first connection portion, in the first plane region of the third pattern layer; a third winding portion which is connected to a negative end of the second winding portion, and, starting from the negative end of the second winding portion, wound counterclockwise and spirally inward around the second connection portion and extending to be connected to the second connection portion, in the second plane region of the third pattern layer; and a fourth winding portion which is connected to the third winding portion via the second connection portion and, starting from the second connection portion in the fourth pattern layer, wound counterclockwise and spirally outward around the second connection portion, and connected to a negative end, in the second plane region of the fourth pattern layer, wherein the printed pattern wiring of the secondary winding is formed in the first pattern layer and the second pattern layer, and wherein the printed pattern wiring of the secondary winding includes: a fifth winding portion which is, starting from a positive end, wound clockwise and spirally inward around the second connection portion of the first insulating layer and extending to be connected to the second connection portion, in the second plane region of the first pattern layer; a sixth winding portion which is connected to the fifth winding portion via the second connection portion and, starting from the second connection portion in the second pattern layer, wound clockwise and spirally outward around the second connection portion, in the second plane region of the second pattern layer; a seventh winding portion which is connected to a negative end of the sixth winding portion, and, starting from the negative end of the sixth winding portion, wound counterclockwise and spirally inward around the first connection portion and extending to be connected to the first connection portion, in the first plane region of the second pattern layer; and an eighth winding portion which is connected to the seventh winding portion via the first connection portion and, starting from the first connection portion in the first pattern layer, wound counterclockwise and spirally outward around the first connection portion, and connected to a negative end, in the first plane region of the first pattern layer.

2. The signal transmission circuit according to claim 1, wherein the primary winding is configured such that a current flows clockwise through the wound printed pattern wiring provided in the first plane region while a current flows counterclockwise through the wound printed pattern wiring provided in the second plane region, and wherein the secondary winding is configured such that a current flows counterclockwise through the wound printed pattern wiring provided in the first plane region while a current flows clockwise through the wound printed pattern wiring provided in the second plane region.

3. The signal transmission circuit according to claim 1, wherein one secondary-side end of the pattern transformer is connected to one end of a coil, wherein another end of the coil is connected to one end of a first capacitor, wherein another end of the first capacitor is connected to another secondary-side end of the pattern transformer, and wherein the coil and the first capacitor form a resonance circuit which resonates with an AC signal output from a secondary side of the pattern transformer.

* * * * *